W. G. SCHMITT.
BALANCING DEVICE FOR WHEELS.
APPLICATION FILED MAR. 29, 1912.

1,160,000.

Patented Nov. 9, 1915.

Witnesses
Hugh Ott
P. M. Smith

Inventor
William G. Schmitt
By Victor J. Evans
Attorney

UNITED STATES PATENT OFFICE.

WILLIAM G. SCHMITT, OF ST. LOUIS, MISSOURI.

BALANCING DEVICE FOR WHEELS.

1,160,000.    Specification of Letters Patent.    Patented Nov. 9, 1915.

Application filed March 29, 1912.  Serial No. 687,269.

*To all whom it may concern:*

Be it known that I, WILLIAM G. SCHMITT, a citizen of the United States, residing at St. Louis, State of Missouri, have invented new and useful Improvements in Balancing Devices for Wheels, of which the following is a specification.

This invention relates to balancing devices for pulleys, etc., the object of the invention being to provide simple and reliable means whereby a wheel, pulley, or similar device may be easily, quickly, and economically balanced by an ordinary workman, without requiring the services of an expert, and without the use of the expensive apparatus at present required.

On all cast iron or soft metal pulleys, fly wheels, or the like in use to-day, a certain amount of superfluous metal is cast upon the inside of the rim, or upon the arms or spokes of the wheels in the shape of solid balls or hemi-spheres, portions of which are removed by the workmen, in order to strike a correct balance for the wheel as a whole. Such a method requires the services of a skilled mechanic, who, with the aid of a compressed air chisel, removes portions of these balls or projections from the inside of the rim or from the arms or spokes, until the wheel shows a proper balance on the balancing table. This requires several operations, and the wheel must be lifted from the balancing table a number of times, before the correct balance is obtained.

By means of the invention, hereinafter described, the wheel may be brought to a proper balance, without removing the same from the balancing table, in one-fourth the time required by the old method, and at the same time, the balancing of the wheel or other device may be effected by an ordinary unskilled mechanic.

With the above and other objects in view, the invention consists in the construction, combination and arrangement of parts, as will be hereinafter more fully described, illustrated in the accompanying drawings, and pointed out in the claim hereunto appended.

Figure 1:
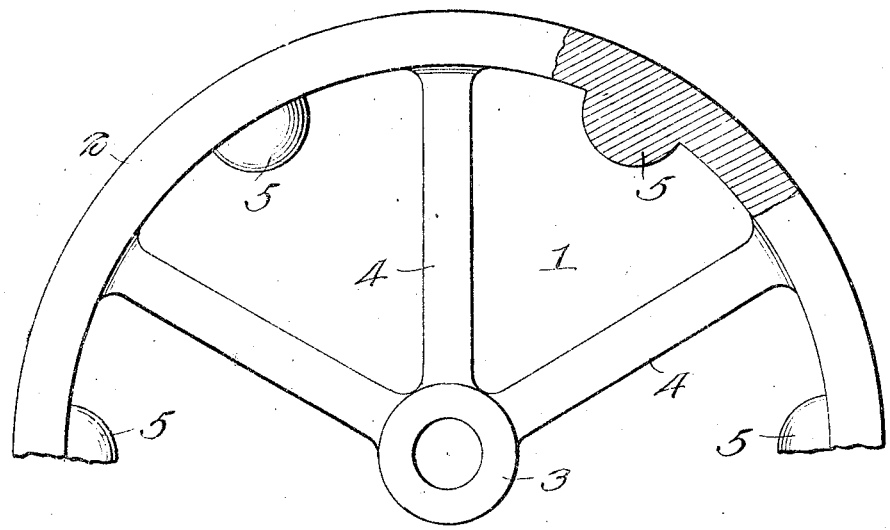
Figure 2:
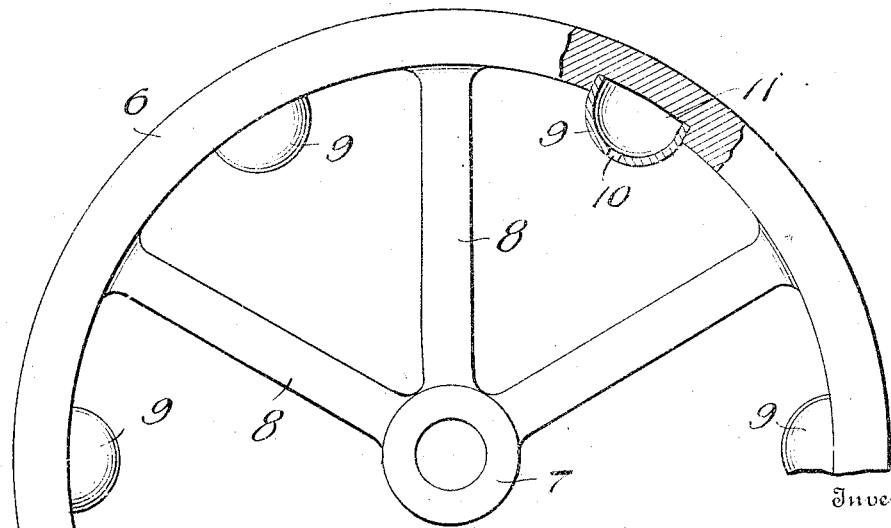

In the drawings: Figure 1 is a side elevation of a wheel or pulley, as now ordinarily cast with the solid projections on the inside of the rim. Fig. 2 is a similar view, partly in section, illustrating the present invention.

Referring to the drawings, 1 designates a wheel of the old type, provided with the usual rim 2, hub 3, arms or spokes 4, and solid hemi-spherical projections 5 cast integrally with the surface of the rim.

As previously stated, in balancing such a wheel, it is necessary to chisel off or remove portions of the projections 5. In this improved construction, the wheel or pulley, as shown in Fig. 2, embodies the usual rim 6, hub 7, and arms or spokes 8. In carrying out the present invention, hollow pockets or containers 9 are cast integrally with the rim 6, the said pockets or containers being preferably of hemi-spherical form, as clearly shown, and provided with openings or inlets 10, through which any suitable weighty material may be introduced in the operation of properly balancing the pulley.

In the preferred embodiment of the invention, the rim 6 is provided in its inner face with recesses 11, commensurate in size with the base of the container which covers said recess, and in this way the capacity of the container is materially increased.

After placing the wheel or pulley on the balancing table, molten metal is poured into one or more of the pockets or containers, in accordance with the requirements, until the necessary weight has been provided at the proper point to obtain a perfect balance of the wheel. It will be apparent that this is a simple and quick operation, and it is unnecessary to remove the wheel or pulley from the balancing table, until the balancing has been completed. Of course, in lieu of molten metal, any soft metal may be driven through the inlets to the pockets or containers, until the proper balancing has been perfected. It is preferred, however, to use molten metal, as it will take the shape of the interior of the containers, and by reason of the shape of the containers, such body of metal poured therein will, after hardening, fit closely within the containers and not move about or rattle.

Under the old plan of balancing fly wheels, pulleys, or the like, it requires about one hour on the part of a skilled workman to perfect a balance, whereas by means hereinabove described, an ordinary workman is able to balance a wheel correctly in from ten to fifteen minutes.

What is claimed is:

In combination, a wheel having its inner peripheral surface provided at spaced intervals with a plurality of cylindrical pockets, and semi-spherical metallic cups arranged to bear edge-wise in the bottom planes of said pockets, each of said cups having an opening arranged to allow molten metal to enter the interior of the cup.

In testimony whereof I affix my signature in presence of two witnesses.

WILLIAM G. SCHMITT.

Witnesses:
 WILIAM H. SCHMITT,
 JACOB SCHMITT.